Patented Mar. 30, 1926.

1,578,454

UNITED STATES PATENT OFFICE.

MELVILLE J. MARSHALL AND GEORGE S. SHAW, OF SHAWINIGAN FALLS, QUEBEC, CANADA, ASSIGNORS, BY MESNE ASSIGNMENTS, TO CANADIAN ELECTRO PRODUCTS COMPANY, LIMITED, OF MONTREAL, CANADA.

MANUFACTURE OF ACETIC ANHYDRIDE AND ACETALDEHYDE FROM ETHYLIDENE DIACETATE.

No Drawing.      Application filed January 26, 1920. Serial No. 354,225.

*To all whom it may concern:*

Be it known that we, MELVILLE J. MARSHALL and GEORGE S. SHAW, both subjects of the King of Great Britain, and residents of the town of Shawinigan Falls, in the Province of Quebec and Dominion of Canada, have invented certain new and useful Improvements in the Manufacture of Acetic Anhydride and Acetaldehyde from Ethylidene Diacetate, of which the following is a full, clear, and exact description.

This invention relates to improvements in the manufacture of acetic anhydride and acetaldehyde from ethylidene diacetate, and the object of the invention is to provide for an increased production of anhydride.

A further object is to avoid the formation of tar and the consequent production of acetic acid.

In the production of acetic anhydride from ethylidene diacetate according to the equation;

$$CH_3CH(OOCCH_3)_2 \longrightarrow (CH_3CO)_2O + CH_3CHO$$

by previously known methods, a serious loss of efficiency occurs, owing to the formation of considerable quantities of acetic acid as the result of a secondary reaction.

It has already been proposed to hasten the decomposition of the ethylidene diacetate by the use of catalysts, such as sulphuric acid, sodium bisulphate, potassium bisulphate, mercuric sulphate, ammonium persulphate and the like. The use of these agents has the disadvantage that there is considerable secondary reaction producing a large amount of acetic acid relatively to the anhydride.

According to this invention, the formation of anhydride is increased and the formation of acetic acid decreased as compared with previously known results, by heating the ethylidene diacetate to ebullition and adding thereto at suitable intervals a small amount of phosphoric acid to serve as a catalyst. The catalyst should be added only in very small amounts, since if an excess of catalyst is present tar formation and the production of largely increased amounts of acetic acid are unavoidable. The catalyst should therefore be added only in amounts and at intervals sufficient to maintain the reaction at reasonable velocity.

A comparison of the results obtained according to this invention with results obtained by the use of other catalysts is shown in the following table:—

| Catalyst | Ratio anhydride to acetic acid produced |
|---|---|
| Ammonium persulphate | 1.45 |
| Sulphuric acid | 3.7 |
| Phosphoric acid | 9.1 |

The following example illustrates the process:—

1000 gms. of ethylidene diacetate is heated to ebullition at atmospheric pressure in a vessel fitted with a rectifying column terminating in a condenser and the heating is continued during the reaction, preferably to such extent as will maintain the reaction liquid in gentle ebullition. Concentrated phosphoric acid is then added, 12 drops at a time, at intervals of 15 minutes to 30 minutes, till 4 gms. in all have been added. It is found that this rate is sufficient to keep the aldehyde coming off at a fairly constant rate.

This aldehyde on being condensed amounts to about 250 gms. with a content of about 5% acetic acid, which can be separated from the aldehyde by fractional distillation. In most cases, however, the acetic acid passing over with the aldehyde is quite small in amount.

Starting with nearly pure ethylidene diacetate 740 gms. of a liquid of the following composition is eventually left in the decomposition vessel:

| | Per cent. |
|---|---|
| Acetic anhydride | 75.0 |
| Acetic acid | 8.0 |
| Ethylidene diacetate | 17.0 |
| | 100.0 |

Thus fully 87.4% of the total ethylidene diacetate present has been decomposed.

This acetic acid and anhydride are then distilled from the vessel through a rectifying column and condensed, till only ethylidene diacetate remains behind, or the undecomposed ethylidene diacetate may be purified by distillation and added to a further batch for decomposition. More ethylidene diacetate is then added to the kettle and the process repeated.

The condensate of acetic acid and acetic anhydride containing some ethylidene diacetate, is subjected to a further fractional distillation in a second still fitted with a very efficient rectifying column. In this way, a mixture of acetic acid and acetic anhydride is obtained practically free from ethylidene diacetate.

This mixture normally contains 80% to 90% acetic anhydride, which is better than the ordinary commercial material. For this reason it is not necessary to separate any of the acetic acid from the anhydride by fractional distillation.

While it has been stated in the foregoing example that concentrated phosphoric acid is used and the process carried on at atmospheric pressure, it will be understood that these conditions pertain solely to the particular example given and that the invention is not limited thereto, as the process may be carried on under any pressure practicable either sub-atmospheric or super-atmospheric and with dilute acid.

While for all practical purposes, the addition of phosphoric acid up to 1.5% of the weight of the diacetate will be sufficient, it may nevertheless be found advisable under certain circumstances to add further acid, and therefore this invention contemplates the addition of acid up to approximately 5.0% of the weight of the diacetate. While the superior results of this process are due largely to the use of phosphoric acid, they are also due partly to the manner in which the acid is introduced.

In the foregoing specification, certain amounts of acid have been referred to and it will be understood that these amounts are free acid or acid available for the reaction of the invention. If the process is carried out in a vessel of iron, aluminum, copper or any other ordinary metal, the metal is slowly dissolved and precipitates a portion of the phosphoric acid as an insoluble phosphate. Therefore when apparatus is used which is attacked by the acid, it will be necessary to add an excess of acid over the requirements of the process. Apparatus of glass or earthenware is not destroyed, but is not satisfactory from a commercial point of view and the process will therefore preferably be carried out in metal apparatus protected by suitable enamel.

The ethylidene diacetate as found in commerce is not a pure article but may contain up to 25% of acetic acid. The presence of the acid is not in any way detrimental to the reaction previously described.

In carrying out the process, although the material may be at the temperature of the boiling point of ethylidene diacetate at the commencement of the process, the temperature of the liquid may drop very materially after the addition of the catalyst, and may remain at a temperature below the boiling point of ethylidene diacetate, although the material still has the appearance of boiling. This appearance of ebullition is due to the escape of a mixture, chiefly of acetaldehyde and acetic anhydride, which, under the conditions of the reaction, come off at a temperature below the boiling temperature of ethylidene diacetate.

Having thus described our invention, what we claim is:—

1. A process for the manufacture of acetic anhydride and acetaldehyde from ethylidene diacetate, in which phosphoric acid is added to the diacetate as a catalyst to facilitate decomposition of the diacetate by heat.

2. A process according to claim 1, in which the ethylidene diacetate is maintained in ebullition and the produced acetaldehyde continuously distilled off through a rectifying column, the temperature of which is adjusted to permit the passing off of aldehyde only.

3. A process for the manufacture of acetic anhydride and acetaldehyde from ethylidene diacetate, which includes adding phosphoric acid to the ethylidene diacetate at intervals of time until most of the diacetate is decomposed and maintaining a temperature sufficient to keep the reaction liquor in ebullition.

4. A process according to claim 3, in which the proportion of each addition of catalyst to the diacetate is approximately .03% by weight.

5. A process for the manufacture of acetic anhydride and acetaldehyde from ethylidene diacetate, in which the diacetate is heated to ebullition with up to 5.0% of its weight of phosphoric acid added in small amounts during the course of the decomposition.

6. A process for the manufacture of acetic anhydride and acetaldehyde from ethylidene diacetate, in which the diacetate is heated to ebullition with up to 1.0% of its weight of phosphoric acid for the duration of active decomposition, and the heating continued with additions of phosphoric acid until most of the diacetate has been decomposed.

7. A process for the manufacture of acetic anhydride and acetaldehyde from ethlidene diacetate, in which the diacetate is heated to ebullition with phosphoric acid under a rectifying column and acetaldehyde recovered at the outlet of the column during the decomposition of the diacetate, the residual liquor being subsequently distilled off until only ethylidene diacetate remains and the distillate freed from entrained ethylidene diacetate by fractioning.

8. A method of producing acetic anhydride and acetaldehyde, which comprises adding phosphoric acid to ethylidene diacetate, heating the mixture and continuously separating the produced acetaldehyde.

9. A method of producing acetic anhydride and acetaldehyde, which includes the step of gradually adding phosphoric acid to ethylidene diacetate while heating, the total amount of acid added being not more than 5% of the weight of ethylidene diacetate.

In witness whereof, we have hereunto set our hands.

MELVILLE J. MARSHALL.
GEORGE S. SHAW.